United States Patent Office

3,329,663
Patented July 4, 1967

3,329,663
ALLYL AZAPHOSPHORINE COMPOUNDS AND
POLYMERS THEREOF
Harry Rex Allcock and Walter Moreland Thomas, Darien,
Conn., assignors to American Cyanamid Company,
Stamford, Conn., a corporation of Maine
No Drawing. Filed Apr. 7, 1964, Ser. No. 358,104
19 Claims. (Cl. 260—89.7)

ABSTRACT OF THE DISCLOSURE

This invention relates to novel groups of those compounds having the formula (I)
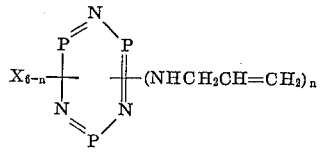

and those having the formula (II)
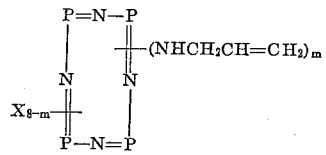

wherein $n$ is a whole positive integer of from 1 to 6, inclusive, $m$ is a whole positive integer of from 1 to 8, inclusive, and X is a chlorine or bromine radical. Still more particularly, this invention relates to a novel group of polymers produced from the monomers of Formulae I and II, above, which polymers possess a very high thermal stability. Still more particularly, this invention relates to a method for the production of polymers of high thermal stability from monomers represented by Formulae I and II, above, and to the polymers produced thereby.

---

This application is a continuation-in-part of my application, Serial No. 290,634, filed June 26, 1963, and now abandoned.

We have now discovered that polymers, copolymers, terpolymers, etc. of the novel monomers represented by Formulae I and II, above, which polymers are very stable at high temperatures, can be produced by contacting said monomers with a free-radical generating catalyst under specific reaction conditions. The production of polymers of this type enables the use thereof in such fields wherein high thermal stability is a prerequisite, such as in ash trays, reinforced thermoset industrial laminates, printed circuits and the like.

It is therefore an object of the present invention to provide a novel group of monomeric compounds, i.e. those represented by Formulae I and II, above.

It is a further object of the present invention to provide a method for the production of polymers having a very high thermal stability, from monomers represented by Formulae I and II, above, and to products produced thereby.

It is a further object of the present invention to provide a novel group of polymers having very high thermal stability, which polymers may be produced by contacting monomeric compounds represented by Formula I or II, above, with a free-radical generating catalyst under various specific reaction conditions.

These and other objects of the present invention will become more apparent to one skilled in the art upon reading the more detailed description set forth hereinbelow.

The novel monomers

The novel monomers of the present invention, as represented by Formulae I and II, above, may be produced by reacting 2,2,4,4,6,6-hexahalo-2,2,4,4,6,6-hexahydro - 1,3,5, 2,4,6-triazatriphosphorine or 2,2,4,4,6,6,8,8-octahalo - 2,2, 4,4,6,6,8,8-octahydro - 1,3,5,7,2,4,6,8 - tetraazatetraphosphorine with $n$ or $m$ moles of allylamine in the presence of a suitable acid acceptor. The reaction proceeds via hydrohalo acid formation according to the equation:

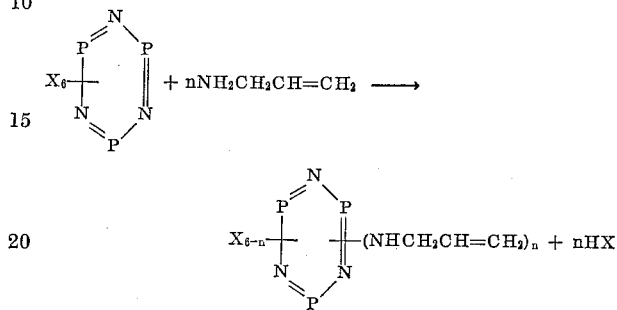

The same reaction occurs in the formation of the compounds represented by Formula II, i.e.

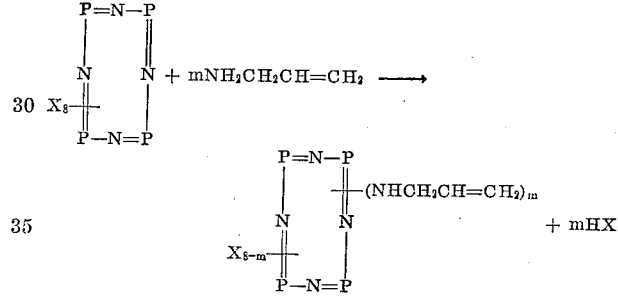

wherein X, $m$ and $n$ are as specified above in regard to Formulae I and II.

As specified, the amount of allylamine used depends upon the specific allyl substituted azaphosphorine desired, one mole of allylamine being employed for each halogen which is being replaced from the hexa or octa halo charge material.

Any known acid acceptor which does not react with the halogen of the charge material may be used in the production of the allyl azaphosphorines, with such compounds as triethylamine, trihexylamine, etc. being exemplary. It is also feasible to utilize an excess of the allylamine reactant in the capactiy of an acid acceptor. Generally, the same amount of acid acceptor as allylamine is employed in order to account for the displaced acid. When the allylamine is used both as a reactant and an acid acceptor, double the quantity which is used with an individual acid acceptor should be employed.

The reaction is preferably carried out in the presence of an inert solvent. Any compound which is a solvent for the allylamine and the haloazophosphorine and inert during the reaction may be used for this purpose in amounts sufficient to solubilize these compounds. In certain cases non-solvents for the product may be used, or non-solvents for one of the reagents. In such a case, the heterogeneous reaction would be slower but none the less effective. Examples of applicable inert solvents include the aromatic hydrocarbons, i.e. benzene, toluene, xylene, etc., the aliphatic hydrocarbons, i.e. pentane, hexane, heptane, etc., chlorinated hydrocarbons, ethers, tetrahydrofuran and the like. An excess of one of the above-mentioned acid acceptors may also be used as a solvent, the only limitation in this instance, being that the compound used should be inert to the starting materials and the products, i.e. no decomposition of them should be initiated by the compound. This is, of course, true also in regard to the specific inert solvent compounds mentioned, as such, hereinabove.

The temperature of the reaction should be maintained at a range of about 0° C. to about 200° C., preferably about 25° C. to about 150° C. preferentially at atmospheric pressure. Lower or higher pressures may be used, however, if desired or necessary, without detracting from the efficacy of the process.

The hexahalotriazatriphosphorine and the octahalotetraazatetraphosphorine starting materials from which our novel monomers are produced are well known in the art and may be produced by any known procedure, such as, for example, those shown in articles by Shaw et al., Chem. Review, vol. 62, page 247 (1962), or Schmulbach, Progress in Organic Chemistry, vol. 4, page 275 (1962). These starting materials are generally produced, according to those procedures, in admixture with one another so that isolation of one from the other is generally necessary, although not essential. Any known isolation and purification technique can be used for this purpose, such as, for example, treating the product admixture by sublimation at about 120° C. and 10 mm. of mercury and recrystallization from heptane.

The monomeric compounds of Formulae I and II are low melting point waxy crystalline solids. Those of Formula I generally have melting points ranging from about 90° C. to 91° C. while those of Formula II have melting points in the order of 77° C. to 78° C. All the products are of a white to yellow color.

Various compounds which are produced according to the above enumerated process and which are therefore represented by Formula I, above, include the following derivatives of 2,2,4,4,6,6-hexahydro-1,3,5,2,4,6-triazatriphosphorine:

the 2-(allylamino)-2,4,4,6,6-pentachloro derivative,
the 2-(allylamino)-2,4,4,6,6-pentabromo derivative,
the 2,2-bis(allylamino)-4,4,6,6-tetrachloro derivative,
the 2,2-bis(allylamino)-4,4,6,6-tetrabromo derivative,
the 2,4-bis(allylamino)-2,4,6,6-tetrachloro derivative,
the 2,4-bis(allylamino)-2,4,6,6-tetrabromo derivative,
the 2,2,4-tris-(allylamino)-4,6,6-trichloro derivative,
the 2,2,4-tris(allylamino)-4,6,6-tribromo derivative,
the 2,2,4,4-tetra(allylamino)-6,6-dichloro derivative,
the 2,2,4,4-tetra(allylamino)-6,6-dibromo derivative,
the 2,2,4,4,6-penta(allylamino)-6-chloro derivative,
the 2,2,4,4,6-penta(allylamino)-6-bromo derivative,
the 2,2,4,4,6,6-hexa(allylamino) derivative,
the 2,4,6-tris(allylamino)-2,4,6-trichloro derivative,
the 2,4,6-tris(allylamino)-2,4,6-tribromo derivative,
the 2,2,4,6-tetra(allylamino)-4,6-dichloro derivative and
the 2,2,4,6-tetra(allylamino)-4,6-dibromo derivative.

Those compounds which are represented by Formula II, above, include the following derivatives of 2,2,4,4,6,6,8,8-octahydro-1,3,5,7,2,4,6,8-tetraazatetraphosphorine:

the 2-(allylamino)-2,4,4,6,6,8,8-heptachloro derivative,
the 2-(allylamino)-2,4,4,6,6,8,8-heptabromo derivative,
the 2,2-bis(allylamino)-4,4,6,6,8,8-hexachloro derivative,
the 2,2-bis(allylamino)-4,4,6,6,8,8-hexabromo derivative,
the 2,4-bis(allylamino)-2,4,6,6,8,8-hexachloro derivative,
the 2,4-bis(allylamino)-2,4,6,6,8,8-hexabromo derivative,
the 2,2,4-tris(allylamino)-4,6,6,8,8-pentachloro derivative,
the 2,2,4-tris(allylamino)-4,6,6,8,8-pentabromo derivative,
the 2,2,4,4-tetra(allylamino)-6,6,8,8-tetrachloro derivative,
the 2,2,4,4-tetra(allylamino)-6,6,8,8-tetrabromo derivative,
the 2,2,4,4,6-penta(allylamino)-6,8,8-trichloro derivative,
the 2,2,4,4,6-penta(allylamino)-6,8,8-tribromo derivative,
the 2,2,4,4,6,6-hexa(allylamino)-8,8-dichloro derivative,
the 2,2,4,4,6,6,8-hepta(allylamino)-8-chloro derivative,
the 2,2,4,4,6,6,8,8-octa(allylamino) derivative,
the 2,4,6,8-tetra(allylamino)-2,4,6,8-tetrachloro derivative,
the 2,4,6,8-tetra(allylamino)-2,4,6,8-tetrabromo derivative,
the 2,2,4,6-tetra(allylamino)-4,6,8,8-tetrachloro derivative
the 2,2,4,6-tetra(allylamino)-4,6,8,8-tetrabromo derivative,
and the like.

As mentioned above, we have now found that these novel monomeric compounds may be used to form thermoplastic, thermosetting or thermoset polymeric materials which may be manufactured into various articles such as by molding, casting, laminating, etc., alone or in admixture with other materials, to produce articles possessing excellent thermal stability at temperatures above, for example, 300° C.

The polymerization process

The novel polymerization process of the present invention comprises heating the compounds of Formula I or II, above. The polymerization reaction may be conducted with or without the addition of various free-radical generating catalysts, alone or in the presence of an inert solvent. When used, the catalysts are employed in concentrations ranging from about 0.01 to about 25.0 percent, by weight, preferably 1.0 to 10.0 percent, by weight, based on the total weight of the monomers undergoing polymerization. Examples of catalysts which may be utilized for this purpose include the organic peroxides such as methyl ethyl ketone peroxide, benzoyl peroxide; the hydroperoxides such as cumene hydroperoxide; the persulfate type compounds such as potassium persulfate or catalysts such as azobisisobutyronitrile and the like. Additionally, such catalysts as lauroyl peroxide, 2,5-dimethyl-2,5-di-(t-butylperoxy)hexane, the dialkyl peroxides, e.g., diethyl peroxide, t-butyl peroxypivalate, dipropyl peroxide, dilauryl peroxide, di-(tertiary-butyl) peroxide and di-(tertiary-amyl)peroxide, such peroxides often being designated as ethyl, propyl, lauryl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, phthaloyl peroxide, benzoyl peroxide, etc.; unsymmetrical or mixed diacyl peroxides, e.g., acetyl benzoyl peroxide, propionyl benzoyl peroxide, etc.; and salts of inorganic per-acids, e.g. ammonium persulfate, sodium persulfate, sodium percarbonate, potassium percarbonate, sodium perborate, potassium perborate, potassium perphosphate, sodium phosphate, etc. Other examples of organic peroxide catalyst which may be employed are the following: tertiary-butyl diperphthalate, tertiary-butyl perbenzoate, 2,4-dichlorobenzoyl peroxide, p-chlorobenzoyl peroxide, 2,2 - bis(tertiary-butylperoxy)butane, hydroxyheptyl peroxide, the diperoxide of benzaldehyde, azobisisobutyronitrile and the like.

The polymerization reaction is conducted at a temperature ranging from about 20° C. to about 500° C., preferably 50° C. to 350° C., said temperatures being governed at the lower limit by the tendency of the mixture to become solidified at lower temperatures and at the higher limit by the volatilization of monomer and the rapid decomposition of the catalyst used, if any. Atmospheric pressure is generally employed during the polymerization, however, subatmospheric and superatmospheric pressures my also be used when necessary or desirable without detracting from the efficacy of the process or from properties of the polymers produced.

As mentioned above, the polymerization may be carried out in the presence of an inert solvent for the charged monomer. Although it is preferred that no solvent be employed, if one is deemed necessary, any material which is a solvent for the monomer may be used in the process provided it is inert to the catalyst system. However, it is stressed that the solvent employed may affect the properties of the resulting polymer in that the degree of cross-linking of the resultant polymer may be materially decreased and the rate of reaction may be slowed down if a solvent is present.

Examples of solvents which may be used, if desired, include the aromatic hydrocarbons, e.g., benzene, toluene, xylene, naphthalene and the like, pyridine, aliphatic hydrocarbons, e.g. pentane, hexane, heptane, and the like, preferably in concentrations sufficient to solubilize the system, i.e. about 50 percent to 200 percent, by weight, based on the weight of the monomers.

The polymerization reaction should be conducted in the substantial absence of atmospheric oxygen. Accordingly, it is necessary to use catalysts, solvents, monomers, etc., which have been purged of oxygen and to intermittently sweep the reaction vessel with an inert gas prior to and during the reaction. Alternatively, the reaction may be carried out in vacuum with the same results after initially sweeping the vessel. Examples of inert gases which may be used for this purpose include nitrogen, neon, argon, normally gaseous hydrocarbons, i.e. propane, butane and the like. By including a substantial amount of oxygen, the molecular weight of the polymer is materially decreased and therefore it is preferred that the amount of oxygen in the system be maintained at a minimum, i.e. less than 1 percent.

The reaction is allowed to proceed from about 10 seconds to 72 hours, preferably 10 to 24 hours, the longer times being used in order to insure complete reaction, since, generally, at the end of about 20 hours, the polymers are fully developed in regard to their degree of polymerization.

As mentioned above, the polymers produced by the above method result in the production of thermoplastic, thermosetting or thermoset products. The specific state of the polymer produced depends directly upon the conditions employed during the polymerization. That is to say, the conditions of catalyst, temperature and contact time can be varied so as to produce any specific type of polymer desired. By merely regulating any or all of these variables, the polymer produced may be thermoplastic, thermosetting or thermoset, the general tendency being that the less drastic or severe the conditions, the more probability of producing a thermoplastic polymer and conversely, the more severe the conditions, the better chance for the production of thermoset polymers. More specific details in regard to these products can be gleaned from a perusal of the examples set forth hereinbelow.

The reaction, in each instance, may be terminated at any time if desired, by merely admitting air to the system, lowering the temperature, adding a chain-length regulator etc. or any other method known to the art, thereby producing a polymeric material not fully polymerized. This material can then be treated in any desired manner, i.e. shaped or blended with other resins or materials, and completely polymerized by application of heat.

The nature or state of the polymer produced results from the degree of cross-linking of the polymer by free azaphosphorine monomer during the polymerization, the thermoset polymers being almost completely cross-linked.

It is also within the scope of the present invention to copolymerize the monomers of Formulae I and II, with from about 5 percent to about 95 percent, by weight, based on the weight of the azaphosphorine monomer, preferably about 25 percent to about 75 percent, by weight, of various ethylenically unsaturated monomers such as, for example, methyl methacrylate, styrene, acrylonitrile, etc., to form linear vinyl-type polymers. The procedure utilized for such a copolymerization is generally the same as that set out above for the homopolymerization, that is to say, the same general reaction conditions may be employed.

Examples of monomers which can be copolymerized with the monomers represented by Formulae I and II, and which can be polymerized either singly or in a plurality (two, three, four or any desired number), the latter often being desirable in order to improve the compatibility and copolymerization characteristics of the mixture of monomers and to obtain copolymers having the particular properties for the particular service application, are such monomers as the unsaturated alcohol esters, more particularly, the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids, such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above, vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formulae I and II are the vinyl halides, more particularly, vinyl fluoride, vinyl chloride, vinyl bromide and vinyl iodide, and the various vinylidene compounds, including the vinylidene halides, e.g., vinylidene chloride, vinylidene bromide, vinylidene fluoride, and vinylidene iodide, other comonomers being added if needed in order to improve the compatibility and copolymerization characteristics of the mixed monomers.

Among the comonomers which are preferred for use in carrying our invention into effect are, for example, the methacrylic acid esters having the formula (III)
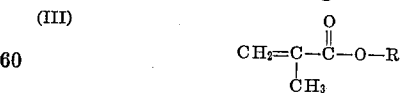

wherein R represents an alkyl radical containing from 1 to 6 carbon atoms, inclusive. Compounds which are represented by the above formula and consequently may be used in the present invention include methyl methacrylate, ethyl methacrylate, propyl methacrylate, isopropyl methacrylate, n-butyl methacrylate, isobutyl methacrylate, amyl methacrylate, hexyl methacrylate and the like. Other preferred compounds include e.g., the various substituted acrylonitriles (e.g. methacrylonitrile, ethacrylonitrile, phenylacrylonitrile, etc.), the various N-substituted acrylamides and alkacrylamides, for instance, N-dialkyl acrylamides and methacrylamides, e.g. N-dimethyl,, -diethyl, -dipropyl, -dibutyl, etc, acrylamides and methacrylamides. Other monomers copolymerizable with the instant novel monomers are given, for instance, in U.S. Patent No. 2,601,572, dated June 24, 1952, where examples are given both by classes and species.

Of course, it is also possible to prepare copolymers produced from two or more of the monomers represented by Formulae I and II, above, and still obtain the benefits heretofore set forth.

Additionally, it is also possible to first form a thermoplastic or thermosetting polymer of the monomers represented by Formulae I and II, above, and then cross-link them via their free unsaturation with any of the co-monomers, or mixtures of comonomers, mentioned above, much in the same manner as polyester resins are cross-linked. In this instance, a thermoset product is produced having properties similar to those mentioned above for the thermoset homopolymer but somewhat modified by the individual properties attributable to the added monomer.

The novel polymers of the present invention, i.e., the thermoplastic or thermosetting polymers may be produced in the form of a prepolymer which may be further cured or polymerized to a thermoset material by the application of heat during molding, casting, etc. These polymers whether thermoplastic or thermosetting are solid, powdery materials and can be utilized for any purpose normally useful for thermosetting and thermoplastic resins per se such as, for example, electrical circuits, waste baskets, ash trays, industrial laminates and the like. The thermoset polymers, as mentioned above, are very thermally stable and have exhibited less than a 10 percent weight loss when subjected to temperatures of about 500° F. in air for periods ranging up to about 500 hours.

Various additives such as antioxidants, stabilizers, lubricants, dyes, pigments, fillers, inhibitors, ultraviolet light absorbers, other resins such as alkyds, epoxy resins and the like may also be added to our novel polymeric compositions in amounts necessary to achieve the specific result desired.

The following examples are set forth for purposes of illustrating only and are not to be construed as limitations on the present invention except as set forth in the appended claims. All parts and percentages are by weight unless otherwise specified.

EXAMPLE 1

A mixture of 10.06 parts of allylamine and 18.8 parts of triethyl amine in tetrahydrofuran are added dropwise over a period of two hours to a solution of 2,2,4,4,6,6-hexachloro - 2,2,4,4,6,-hexahydro - 1,3,5,2,4,6 - triazatriphosphorine (10.4 parts) in tetrahydrofuran in a suitable reaction vessel. The resultant mixture is then stirred at 25° C. for 16 hours and the insoluble white material which precipitates out is filtered off yielding 21.5 parts of triethylamine hydrochloride which is totally soluble in water. The filtrate is evaporated to dryness and the semisolid residue is recrystallized from n-heptane to give 4 parts of white waxy crystals of 2,2,4,4,6,6-hexa(allylamino) - 2,2,4,4,6,6 - hexahydro - 1,3,5,2,4,6 - triazatriphosphorine which softens at 40° C. and melts at 85° C. An infrared spectrum analysis indicates the presence of NH, P=N, CH and CH=CH$_2$ groups. The compound is soluble in benzene, acetone, carbontetrachloride, ethanol and ethyl acetate but is surprisingly soluble in cooled heptane.

*Analysis.*—Theory: C, 45.85%; H, 7.64%; N, 26.76%; P, 19.75%. Found: C, 42.98%; H, 7.15%; N, 24.02%; P, 20.61%.

Molecular weight by vapor-pressure thermistor—523.

EXAMPLE 2

A solution of 106 parts of allylamine and 188 parts of triethylamine in tetrahydrofuran is added dropwise to a solution of 104 parts of 2,2,4,4,6,6-hexachloro-2,2,4,4,6,6-hexahydro-1,3,5,2,4,6-triazatriphosphorine in tetrahydrofuran in a suitable reaction vessel. An immediate formation of a white precipitate is evident. The fluidity of the mixture is increased by the addition of a further amount of tetrahydrofuran and the reaction is allowed to proceed at 25° C. for 36 hours. The white precipitate is filtered off, washed with tetrahydrofuran and dried. The product is shown to be triethyl amine hydrochloride (216 parts). The filtrate is evaporated to dryness to leave a semi-solid resin which is shown by infrared analysis to be 2,2,4,4,6,6-hexa(allylamine)-2,2,4,4,6,6 - hexahydro - 1,3,5,2,4,6 - triazatriphosphorine, [NP(NHCH$_2$CH=CH$_2$)$_2$]$_3$, 116 parts. This compound is purified by washing with a mixture of 50 percent cyclohexane in heptane and a pasty solid is recovered. This solid recrystallizes to a waxy material on recrystallization from n-heptane. The compound melts over a range of 40 to 90° C.

EXAMPLE 3

A solution of 404 parts of triethylamine and 620 parts of allylamine in 800 parts of benzene is added dropwise over 2 hours to a stirred solution of 348 parts of 2,2,4,4,6,6 - hexachloro - 2,2,4,4,6,6 - hexahydro-1,3,5,2,4,6-triazatriphosphorine in 2000 parts of benzene at 10° C. in a suitable reaction vessel. After 24 hours at 25° C. and 24 hours at 80° C., the upper layer is decanted from the lower layer of oil and triethylamine hydrochloride, and is dried over anhydrous magnesium sulfate. Filtration and evaporation yields a waxy solid which is extracted with diethyl ether. The extracts are cooled to −40° C. to yield 103 parts of 2,2,4,4,6,6 - hexa(allylamino) - 2,2,4,4,6,6-hexahydro - 1,3,5,2,4,6 - triazatriphosphorine which melts at 90 to 91° C. Extraction of the oily layer with ether followed by cooling of the extracts, yields a further 28 parts of the product.

EXAMPLE 4

A solution of 34.8 parts of 2,2,4,4,6,6-hexabromo-2,2,4,4,6,6 - hexahydro - 1,3,5,2,4,6-triazatriphosphorine in 150 parts of benzene is added slowly to a stirred solution of 106 parts of allylamine in 100 parts of benzene in a suitable reaction vessel. The mixture is cooled to 20° C. during the 90 minute addition time. The reaction is allowed to proceed at 25° C. for 4 hours and the volatile compounds are then removed at reduced pressure. The residue is then extracted with diethyl ether and the product obtained by cooling to −30° C. is recrystallized from cyclohexane to yield 11.5 parts of 2,2,4,4,6,6-hexa(allylamino) - 2,2,4,4,6,6 - hexahydro-1,3,5,2,4,6-triazatriphosphorine, [NP(NHCH$_2$CH=CH$_2$)$_2$]$_3$ which melts at 90–91° C.

*Analysis.*—Theory: C, 45.85%; H, 7.64%; N, 26.76%; P, 19.74%. Found: C, 45.86%; H, 7.48%; N, 26.52%; P, 19.62%.

Molecular weight by vapor-pressure thermistor—448.

EXAMPLE 5

A solution of 17.1 parts of allylamine and 30 parts of triethylamine in 200 parts of diethyl ether is added dropwise over 3 hours to a rapidly stirred solution of 104 parts of 2,2,4,4,6,6 - hexachloro-2,2,4,4,6,6-hexahydro-1,3,5,2,4,6-triazatriphosphorine in 500 parts of diethyl ether. An immediate formation of a white precipitate is evident. The mixture is then stirred at 25° C. for 24 hours. The white precipitate is filtered off, washed with ether and dried. The product is shown to be triethylamine hydrochloride (49.8 parts). The filtrate is evaporated to an oil which, on distillation at 115 to 150° C. at 0.5 mm. of mercury pressure, yields 73 parts of a colorless oil which after purification by distillation and vapor-phase chromatography is shown to be N$_3$P$_3$Cl$_5$(NHCH$_2$CH=CH$_2$), i.e. 2-(allylamino)-2,4,4,6,6-pentachloro-2,2,4,4,6,6-hexahydro-1,3,5,2,4,6-triazatriphosphorine. The refractive index at 25° C. is 1.5480. An infrared spectrum analysis indicates the presence of NH, CH, P=N and CH=CH$_2$ groups. The material is readily soluble in most organic solvents.

*Analysis.*—Theory: C, 9.77%; H, 1.63%; N, 15.21%; P, 25.25%; Cl, 48.13%. Found: C, 9.95%; H, 1.99%; N, 15.12%; P, 24.59%; Cl, 48.33%.

Molecular weight by vapor pressure thermistor in benzene is 377.

EXAMPLE 6

Following the procedure of Example 1, except that 61.5 parts of 2,2,4,4,6,6 - hexabromo-2,2,4,4,6,6-hexahydro-1,3,5,2,4,6-triazatriphosphorine, 11.4 parts of allylamine and 20.2 parts of triethylamine are used, a 51 percent yield of 2,2 - bis(allylamino) - 2,2,4,4,6,6-hexahydro-4,4,6,6-tetrabromo-1,3,5,2,4,6-triazatriphosphorine is recovered.

EXAMPLE 7

Again following the procedure of Example 1, except that 34.5 parts of 2,2,4,4,6,6-hexachloro-2,2,4,4,6,6-hexahydro-1,3,5,2,4,6-triazatriphosphorine, 17.1 parts of allylamine and 30.3 parts of triethylamine are used, 2,2,4,4,6,6 - hexahydro-4,6,6-trichloro-2,2,4-tris(allylamino)-1,3,5,2,4,6-triazatriphosphorine is recovered in a yield of 58 percent.

EXAMPLE 8

A 49 percent yield of 6,6-dibromo-2,2,4,4,6,6-hexahydro - 2,2,4,4 - tetra(allylamino)-1,3,5,2,4,6-triazatriphosphorine is recovered following the procedure of Example 1 but using 61.5 parts of 2,2,4,4,6,6-hexabromo-2,2,4,4,6,6-hexahydro-1,3,5,2,4,6-triazatriphosphorine, 22.8 parts of allylamine and 40.4 parts of triethylamine.

EXAMPLE 9

Again following the procedure of Example 1, a 55 percent yield of 6-chloro-2,2,4,4,6,6-hexahydro-2,2,4,4,6-penta(allylamino) - 1,3,5,2,4,6-triazatriphosphorine is recovered using 34.5 parts of 2,2,4,4,6,6-hexachloro-2,2,4,4,6,6 - hexahydro - 1,3,5,2,4,6-triazatriphosphorine, 28.5 parts of allylamine and 50.5 parts of triethylamine.

EXAMPLE 10

Following the procedure of Example 7, 15 percent of 2,2,4,4,6,6 - hexahydro - 2,4,6 - trichloro-2,4,6-tris(allylamino)-1,3,5,2,4,6-triazatriphosphorine is recovered upon purification by recrystallization with cyclohexane.

EXAMPLE 11

Following the procedure of Example 8, 17 percent of 4,6 - dibromo - 2,2,4,6,6 - hexahydro-2,2,4,6-tetra(allylamino)-1,3,5,2,4,6-triazatriphosphorine is recovered upon purification by recrystallization with cyclohexane.

EXAMPLE 12

Twenty parts of allylamine are added dropwise to a stirred solution of 4.6 parts of 2,2,4,4,6,6,8,8-octachloro-2,2,4,4,6,6,8,8 - octahydro - 1,3,5,7,2,4,6,8-tetraazatetraphosphorine in 150 parts of benzene at 10° C. in a suitable reaction vessel. After reaction at 25° C. for 5 hours the mixture is washed with 25 parts of water and the benzene layer is dried over anhydrous calcium sulfate. Removal of benzene by vacuum distillation leaves a white residue which is recrystallized from cyclohexane to yield 3.6 parts of 2,2,4,4-6,6,8,8-octa(allylamino)-2,2,4,4,6,6,8,8 - octahydro - 1,3,5,7,2,4,6,8 - tetraazatetraphosphorine which melts at 77–78° C.

*Analysis.*—Theory: C, 45.85; H, 7.64; N, 26.76; P, 19.74. Found: C, 46.02; H, 7.93; N, 26.51; P, 19.35.

Molecular weight by vapor pressure thermistor is 593.

EXAMPLE 13

A mixture of 45.6 parts of allylamine and 80.8 parts of triethyl amine in tetrahydrofuran are added dropwise over a period of two hours to a solution of 2,2,4,4,6,6,8,8,-octachloro - 2,2,4,4,6,6,8,8 - octahydro - 1,3,5,7,2,4,6,8-tetraazatetraphosphorine (46.4 parts) in tetrahydrofuran in a suitable reaction vessel. The resultant mixture is then stirred at 25° C. for 18 hours and the insoluble white material which precipitates out is filtered off. The filtrate is evaporated to dryness and the semi-solid residue is recrystallized from n-heptane to give 20 parts of white waxy crystals of 2,2,4,4,6,6,8,8-octa(allylamino)-2,2,4,4,6,6,8,8-octahydro-1,3,5,7,2,4,6,8-tetraazatetraphosphorine.

EXAMPLE 14

Following the procedure of Example 13 except that 5.7 parts of allylamine and 10.1 parts of triethylamine are employed, a 22 percent yield of 2-(allylamino)-2,2,4,4,6,6,8,8-octahydro-2,4,4,6,6,8,8 - heptachloro - 1,3,5,7,2,4,6,8-tetraazatetraphosphorine is recovered.

EXAMPLE 15

Again following the procedure of Example 13 except that 11.4 parts of allylamine and 20.2 parts of triethylamine are used, 2,2-bis(allylamino)-4,4,6,6,8,8-hexachloro-2,2,4,4,6,6,8,8-octahydro-1,3,5,7,2,4,6,8 - tetraazatetraphosphorine is recovered in a yield of 18 percent.

EXAMPLE 16

A 23 percent yield of 2,2,4,4,6,6,8,8-octahydro-2,2,4,4,6-penta(allylamino)-6,8,8-trichloro - 1,3,5,7,2,4,6,8 - tetraazatetraphosphorine is recovered following the procedure of Example 13 except that 28.5 parts of allylamine and 50.5 parts of triethylamine are employed.

EXAMPLE 17

Again following the procedure of Example 13, a 28 percent yield of 8,8-dichloro-2,2,4,4,6,6-hexa(allylamino)-2,2,4,4,6,6,8,8 - octahydro - 1,3,5,7,2,4,6,8 - tetraazatetraphosphorine is recovered utilizing 34.2 parts of allylamine and 60.6 parts of triethylamine.

EXAMPLE 18

Two parts of the 2,2,4,4,6,6-hexa(allylamino)-2,2,4,4,6,6-hexahydro-1,3,5,2,4,6-triazatriphosphorine produced in Example 1 are heated in a suitable reaction vessel at 200° C. and 0.05 mm. of mercury pressure for 2 hours. After this time approximately one part has sublimed and one part remains undistilled as a pale yellow glass. This glassy polymer shows a changed infrared absorption spectra from that of the starting material, the peaks due to vinyl absorption being absent. The resultant thermoplastic polymer recovered is insoluble in, but is swelled by, benzene and acetone. It softens above 100–150° C. and burns only after strong heating. Thermogravimetric analysis gives a $T_{10}$ value of 370° C. and shows a 65 percent weight loss at 1000° C.

EXAMPLE 19

0.6 part of the 2,2,4,4,6,6-hexa(allylamino)-2,2,4,4,6,6-hexahydro-1,3,5,2,4,6-triazatriphosphorine produced in Example 2 is heated in an evacuated reaction vessel for 2 hours at 200° C. After cooling, the thermoplastic product is a pellet of a yellow resin. The infrared spectrum is distinguished by a diminution in aliphatic unsaturation compared to the starting material.

EXAMPLE 20

4.47 parts of the 2,2,4,4,6,6-hexa(allylamino)-2,2,4,4,6,6-hexahydro-1,3,5,2,4,6-triazatriphosphorine produced in Example 1 and 0.038 part of azobisisobutyronitrile are dissolved in benzene and sealed under vacuum in a suitable reaction vessel. The vessel is immersed in an oil bath at 60° C. for 20 hours and then at 80° C. for 5 hours. 0.8 part of the benzene-insoluble product is filtered off. The resultant thermoplastic polymer has a melting point of 173. A portion of this material is melt-cast on an aluminum plate at 180° C. to form a film which adheres to the metal. Thermogravimetric analysis gives a $T_{10}$ value of 268° C. in air and a weight loss of 67 percent at 1000° C.

EXAMPLE 21

4.47 parts of the 2,2,4,4,6,6-hexa(allylamino)-2,2,4,4,6,6-hexahydro-1,3,5,2,4,6-triazatriphosphorine produced in Example 1 and 0.2 part of benzoyl peroxide are dissolved in methyl methacrylate (10 parts) and the solution is evacuated and sealed in a suitable reaction vessel which is heated at 92° C. for 72 hours. The contents of the vessel are then dissolved in benzene and precipitated in n-heptane to yield 5.3 parts of a thermoplastic copolymer. Microanalysis of the copolymer gives the following values: C, 49.14%; H, 7.57%; N, 13.30%; P, 10.50%; which, based on the phosphorous and nitrogen values, corresponds to a copolymer composition of 53 mol percent of the triazaphosphorine. The intrinsic viscosity of the copolymer in benzene is 0.24 dl./g. and the glass transition temperature is 24° C. When cast from a benzene solution the copolymer forms a transparent flexible film. An impact resistant surface coating is also formed by evaporation of the benzene solution from a stainless steel plate.

EXAMPLE 22

Forty parts of the 2,2,4,4,6,6-hexa(allylamino)-2,2,4,4,6,6-hexahydro-1,3,5,2,4,6-triazatriphosphorine produced in Example 2 and 2 parts of ditertiarybutylperoxide are mixed and heated at 100° C. in a suitable vessel. At this temperature, a 5-layer glass cloth laminate is prepared from the mixture alternating layers of glass cloth and resin. The material is then cured in a nitrogen-filled oven for 5 days at 127° C. followed by 1 day at 160° C. The resultant laminate is an amber-colored thermoset material which shows a heat distortion temperature of 170° C.

EXAMPLE 23

Following the procedure of Example 20, except that the 2-(allylamino)-2,4,4,6,6-pentachloro-2,2,4,4,6,6-hexahydro-1,3,5,2,4,6-triazatriphosphorine produced in Example 5 is used, a thermoplastic resinous material is produced having properties similar to those of the product of Example 20.

EXAMPLE 24

The product of Example 6 is polymerized according to the procedure of Example 20 into a thermoplastic polymer having a $T_{10}$ value of 261° C. in air and a weight loss of 59 percent at 1000° C.

EXAMPLE 25

Fifty parts of the product produced in Example 7 are copolymerized with ten parts of acrylonitrile and 50 parts of methyl methacrylate according to the procedure of Example 21. When the resultant thermoplastic terpolymer is cast from a benzene solution on a glass plate, a solid, self-adhering film is produced.

EXAMPLE 26

The procedure of Example 22 is again followed except that the 6,6-dibromo-2,2,4,4,6,6-hexahydro-2,2,4,4-tetra(allylamino)-1,3,5,2,4,6-triazatriphosphorine produced in Example 8 is used as the monomer. The glass cloth laminate produced has a heat distortion temperature of 178° C. and is very rigid.

EXAMPLES 27–28

The products of Examples 9 and 10 are copolymerized according to the procedure of Example 21 with styrene and methyl methacrylate, respectively. In both instances a thermoplastic product is produced containing a significant amount of the specific triazaphosphorine. When solutions of the two copolymers are solvent evaporated from carbon steel plates, a hard, self-adhering, impact resistant coating is produced.

EXAMPLE 29

The product of Example 11 is homopolymerized into a thermoplastic polymer according to the procedure set forth in Example 20. Ten parts of the resultant polymer is then mixed with 10 parts of styrene and is heated to 100° C. A glass cloth laminate is then formed in 10 layers with the viscous polymer by heating the ten alternate layers of polymer and glass cloth at 140° C. for 6 days. The resultant cured product has a heat distortion temperature of 185° C.

EXAMPLE 30

One part of the product from Example 12 is mixed with 0.05 part of ditertiary butyl peroxide and sealed under vacuum in a suitable reaction vessel. After 24 hours at 120° C., the product is a thermally-stable, amber-colored glassy polymer. No peaks representative of vinyl absorption are present upon subjection of the polymer to infrared analysis. The polymer is insoluble in benzene and acetone. The polymer softens at about 130° C. and thermogravimetric analysis shows a $T_{10}$ value of 365° C. and a 55 percent weight loss at 1000° C.

EXAMPLE 31

Ten parts of 2,2,4,4,6,6,8,8-octa(allylamino)-2,2,4,4,6,6,8,8 - octahydro - 1,3,5,7,2,4,6,8 - tetraazatetraphosphorine are heated in a suitable reaction vessel at 185° C. and 0.05 mm. of mercury for about 3 hours. After this time, approximately 4 parts of the monomer have sublimed and 6 parts remain as a pale white glassy polymer. The polymer, when subjected to infrared analysis, shows a spectrum different from that of the starting material, vinyl absorption being absent. The polymer is insoluble in benzene and acetone and softens at about 150° C. Thermogravimetric analysis gives a $T_{10}$ value of 355° C.

EXAMPLE 32

Five parts of the monoallylamino monomer produced in Example 14 and 0.2 part of benzoyl peroxide are dissolved in methyl methacrylate and the solution is sealed in a suitable reaction vessel which has been evaporated. The solution is heated to 95° C. for about 72 hours. The resultant copolymer is then recovered by precipitation from n-heptane. The yield of polymer is 6.5 parts. The intrinsic viscosity of the copolymer in benzene is 0.19 dl./g. The polymer is dissolved in benzene and cast down on a stainless steel plate and upon evaporation of the benzene yields a transparent flexible film.

EXAMPLE 33

Fifty parts of the bis(allylamino) phosphorine monomer produced in Example 15 and 3 parts of ditertiary butyl peroxide are mixed and heated to 100° C. in a suitable vessel. At this temperature an 8-layer glass cloth laminate is prepared by alternating layers of glass cloth and resin resulting from the temperature treatment. The resultant laminate is then cured in a nitrogen-filled oven for 5 days at 120° C. and one day at 175° C. The resultant laminate is pink-colored and shows a heat distortion temperature of 160° C.

EXAMPLE 34

Fifty parts of the monomer produced in Example 16 are copolymerized with 10 parts of acrylonitrile and 50 parts of ethyl acrylate according to the procedure of Example 32. When the resultant thermoplastic terpolymer is cast from a benzene solution onto a stainless steel plate, a hard film is produced.

EXAMPLE 35

The monomer produced in Example 17 is copolymerized according to the procedure of Example 32 with styrene (50/50). A thermoplastic copolymer is recovered containing a high amount of the phosphorine compound. Solvent evaporation of the copolymer onto a glass plate yields a hard, impact resistant film.

EXAMPLE 36

Seventy-five parts of 2,2,4,4,6,6-hexa(allylamino)-2,2,4,4,6,6-hexahydro-1,3,5,2,4,6-triazatriphosphorine and 25 parts of 2,2,4,4,6,6,8,8 - octa(allylamino) - 2,2,4,4,6,6,8,8-octahydro - 1,3,5,7,2,4,6,8 - tetraazatetraphosphorine are added to a suitable reaction vessel along with 0.5 part of benzoyl peroxide. The vessel is evacuated by bubbling nitrogen gas therethrough and is sealed. The reaction mixture is heated to 90° C. for 48 hours. The reaction media is then dissolved in benzene and the resultant copolymer is precipitated from n-heptane to yield 85 parts of a thermoplastic copolymer which, when evaporated from a benzene solution, yields a hard self-adhering film on glass. Upon heating the polymer to 160° C. for 5 days, a thermoset material is produced having a heat distortion temperature of over 175° C.

We claim:
1. A compound selected from the group consisting of (1) those having the formula

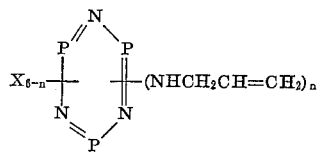

and (2) those having the formula

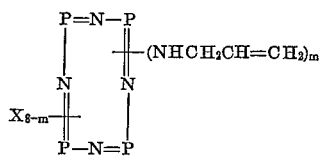

wherein $n$ is a whole positive integer of from 1 to 6, inclusive, $m$ is a whole positive integer of from 1 to 8, inclusive, and X is selected from the group consisting of a chlorine and a bromine radical the substituents on said compounds being bonded only to the phosphorus atoms.

2. A compound according to claim 1 wherein X is a chlorine radical.
3. A compound according to claim 1 wherein X is a bromine radical.
4. 2,2,4,4,6,6 - hexa(allylamino)-2,2,4,4,6,6-hexahydro-1,3,5,2,4,6-triazatriphosphorine.
5. 2-(allylamino)-2,2,4,4,6,6-hexahydro-2,4,4,6,6-pentachloro-1,3,5,2,4,6-triazatriphosphorine.
6. 2,2,4,4,6,6,8,8 - octa-allylamino)-2,2,4,4,6,6,8,8-octahydro-1,3,5,7,2,4,6,8-tetraazatetraphosphorine.
7. 2-(allylamino)-2,2,4,4,6,6,8,8 - octahydro-2,4,4,6,6,8,8-heptachloro-1,3,5,7,2,4,6,8-tetraazatetraphosphorine.
8. A polymer of a compound selected from the group consisting of (1) those having the formula

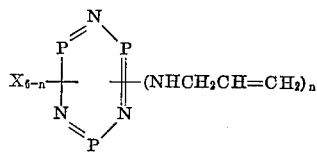

and (2) those having the formula

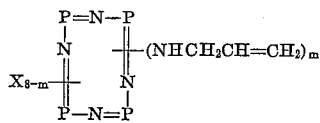

wherein $n$ is a whole positive integer of from 1 to 6, inclusive, $m$ is a whole positive integer of from 1 to 8, inclusive, and X is selected from the group consisting of a chlorine and a bromine radical, the substituents on said compounds being bonded only to the phosphorus atoms.

9. A polymer according to claim 8 wherein X is a chlorine radical.
10. A polymer according to claim 8 wherein X is a bromine radical.
11. A polymer of 2,2,4,4,6,6-hexa(allylamino)-2,2,4,4,6,6-hexahydro-1,3,5,2,4,6-triazatriphosphorine.
12. A polymer of 2-(allylamino)-2,2,4,4,6,6-hexahydro-2,4,4,6,6-pentachloro-1,3,5,2,4,6-triazatriphosphorine.
13. A polymer of 2,2,4,4,6,6,8,8-octa(allylamino)-2,2,4,4,6,6,8,8 - octahydro - 1,3,5,7,2,4,6,8-tetraazatetraphosphorine.
14. A polymer of 2-(allylamino)-2,2,4,4,6,6,8,8-octahydro - 2,4,4,6,6,8,8-heptachloro-1,3,5,7,2,4,6,8-tetraazatetraphosphorine.
15. A method for the production of a polymer having a high thermal stability which comprises contacting a compound selected from the group consisting of (1) those having the formula

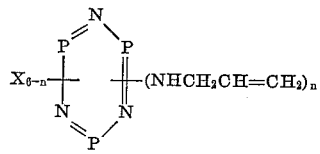

and (2) those having the formula

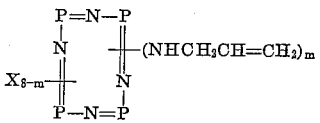

wherein $n$ is a whole positive integer of from 1 to 6, inclusive, $m$ is a whole positive integer of from 1 to 8, inclusive, and X is selected from the group consisting of a chlorine and a bromine radical with a free-radical generating catalyst at a temperature ranging from about 20° C. to about 500° C. for from about 10 seconds to 72 hours the substituents on said compounds being bonded only to the phosphorus atoms.

16. A method according to claim 15 wherein the compound is 2,2,4,4,6,6-hexa(allylamino)-2,2,4,4,6,6-hexahydro-1,3,5,2,4,6-triazatriphosphorine.
17. A method according to claim 15 wherein the compound is 2-(allylamino)-2,2,4,4,6,6-hexahydro-2,4,4,6,6-pentachloro-1,3,5,2,4,6-triazatriphosphorine.
18. A method according to claim 15 wherein the compound is 2,2,4,4,6,6,8,8-octa(allylamino)-2,2,4,4,6,6,8,8-octahydro-1,3,5,7,2,4,6,8-tetraazatetraphosphorine.
19. A method according to claim 15 wherein the compound is 2-(allylamino)-2,2,4,4,6,6,8,8-octahydro-2,4,4,6,6,8,8-heptachloro-1,3,5,7,2,4,6,8-tetraazatetraphosphorine.

References Cited

Allcock, Forgione and Valan, "Phosphonitrilic Compounds. IV. Preparation and Polymerization of Allyl-aminophosphonitrile Compounds," Journal of Organic Chem., 30, #3, pages 947–949 relied on.

JOSEPH L. SCHOFER, *Primary Examiner.*

H. I. CANTOR, *Assistant Examiner.*